Jan. 15, 1957     I. WEBER ET AL     2,777,322
APPARATUS FOR TESTING THE FLEXIBILITY OF MATERIALS
Filed Nov. 2, 1953
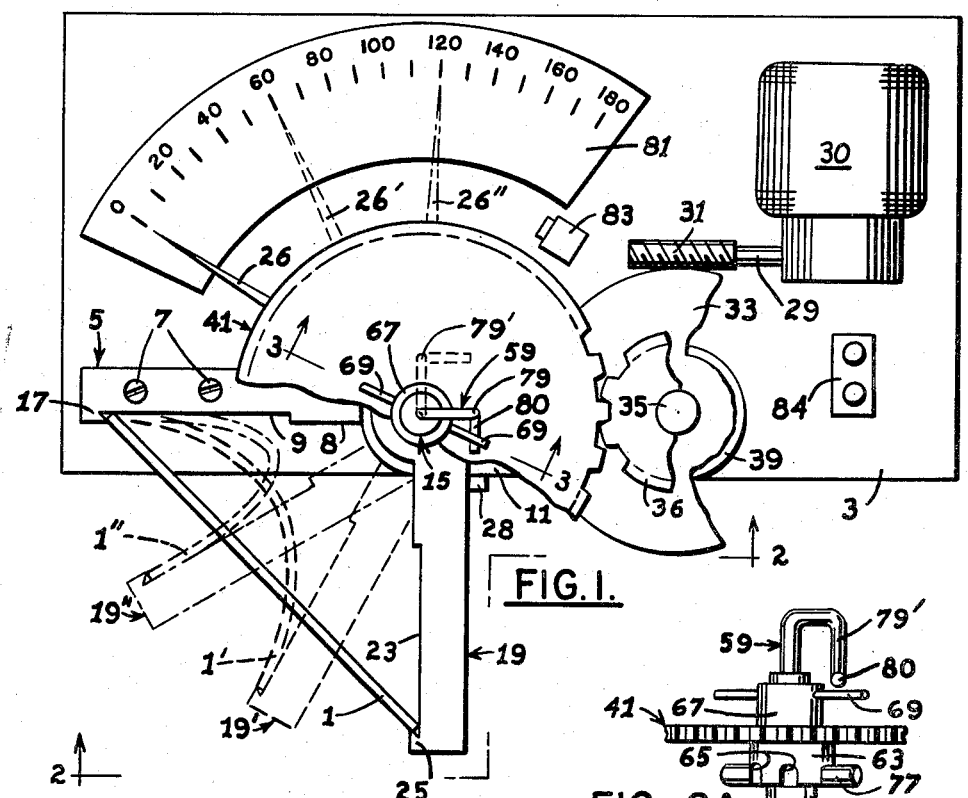
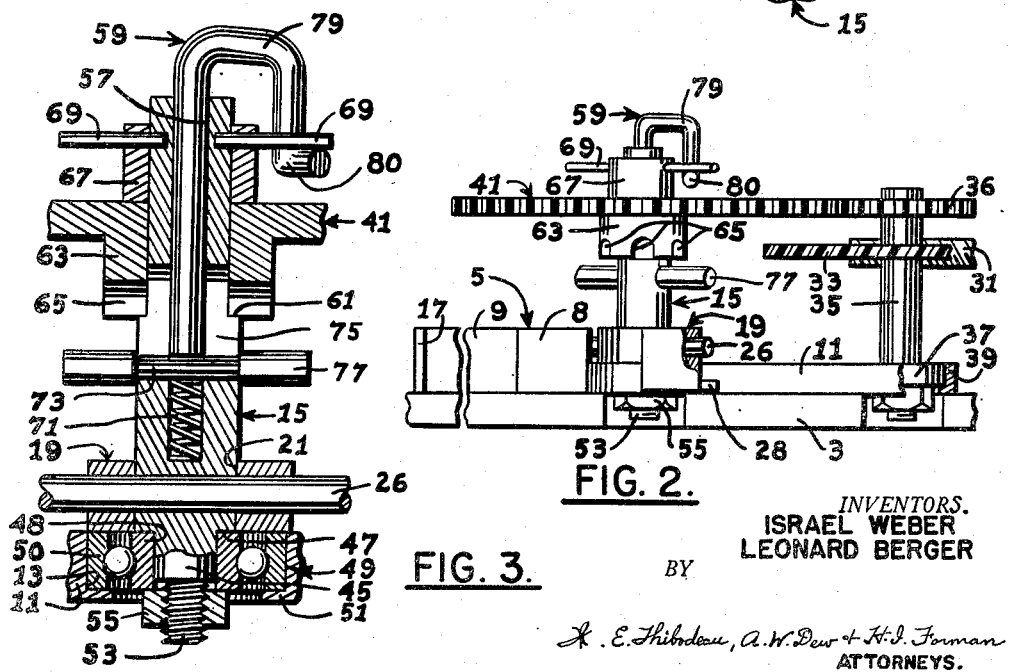
INVENTORS.
ISRAEL WEBER
LEONARD BERGER
BY
*E. Thibodeau, A. W. Dew & H. J. Forman*
ATTORNEYS.

United States Patent Office 2,777,322
Patented Jan. 15, 1957

2,777,322

APPARATUS FOR TESTING THE FLEXIBILITY OF MATERIALS

Israel Weber and Leonard Berger, Philadelphia, Pa., assignors to the United States of America as represented by the Secretary of the Army Application November 2, 1953, Serial No. 389,895

4 Claims. (Cl. 73—100)

(Granted under Title 35, U. S. Code (1952), sec. 266)

The invention described herein may be manufactured and used by or for the Government for governmental purposes without payment of royalties thereon.

This invention relates to measuring apparatus for determining the relative flexibility of materials.

It has been found, in the course of research and development, in the field of plastics, that highly satisfactory indications of the flexibility of a plastic material can be obtained by determining the angle at which a specimen of the material will fracture when bent through an arc at a constant rate. It has been similarly discovered that the test results can be enhanced by bending the specimen at that constant rate and, at the same time, decreasing the radius of curvature of the bent portion.

Inasmuch as the flexibility of many plastics varies with the ambient temperature, some plastic materials will be very flexible at normal room temperatures and will not fracture when subjected to a bend test. At lower temperatures, however, these materials become less flexible and will more readily fracture when bent. Accordingly, highly accurate results can be obtained by subjecting the various material specimens to a test at an ambient temperature which is low enough to assure the fracture of all the test speciments. By conducting the tests at these lowered temperatures and maintaining this temperature constant for all the tests, an index can be established for comparatively rating the flexibility of all the materials tested.

An object of this invention, therefore, is to provide measurement apparatus for determining the relative flexibility of different materials in various temperature ranges.

A further object of this invention is to provide material flexibility testing apparatus by which the comparative flexibility of materials may be determined by bending specimens thereof through an increasing angle at a uniform rate.

A still further object of this invention is to provide material flexibility testing apparatus by which the comparative flexibility of materials may be determined by bending a specimen thereof through an increasing angle at a uniform rate and simultaneously decreasing the radius of curvature of the bent portion of the specimen.

Generally, the apparatus provided in furtherance of this invention includes a pair of relatively moveable, normally divergent arms, between which, a specimen of the material to be tested is held. By means of suitably driven reduction gearing one of the arms is urged into closing position with the other, bending the specimen therebetween. Operatively associated with the moveable arm is a suitably scaled indicator which continuously designates the extent to which the specimen is bent, including the point at which the specimen fractures, whereby the relative flexibility of each of the materials tested can be determined.

All of the foregoing, as well as other objects and advantages of the invention will become apparent from a study of the following specification taken in conjunction with the accompanying drawings, wherein like characters of reference indicate corresponding parts throughout the several views and wherein:

Figure 1 is a plan view, partly broken away, of an apparatus in accordance with this invention, showing, in outline form, a plurality of operative positions of some of the elements, Figure 2 is a front elevational view partly broken away, of the apparatus shown in Figure 1, taken along line 2—2 of Figure 1 and with the clutch assembly shown in disengaged position, Figure 2A is a partial front elevational view similar to Figure 2 showing the clutch assembly in engaged position, and Figure 3 is an enlarged sectional view, taken along line 3—3 of Figure 1, showing in detail the clutch, arm and indicator assembly, the clutch being shown in disengaged position.

Referring to the drawings, and particularly to Figure 1, which, by way of example, illustrates a preferred form of the invention, the apparatus is shown in full lines with the related parts and the specimen 1 in their initial operating positions. Mounted on the base 3 of the apparatus are the several components which cooperate in accordance with this invention, which components include a fixed arm, a moveable arm, a motor, gear train, clutch assembly and measurement indicator.

The fixed arm 5 is attached to the front of the base 3 and held in fixed position thereon by suitable means such as screws 7. The front face 8 of the arm 5 has a recessed portion 9 between its ends, the depth of which substantially corresponds to the thickness of a standard test specimen. The arm 5 also has a longitudinally extending projection 11 adjacent the one extremity thereof which is nearest to the center of the base 3. A hole 13 (Figure 3) extends vertically through the projection 11 to accommodate a freely rotatable pivot shaft 15 therein, the axis of the hole 13 lying in the plane of the arm face 8. Adjacent to the opposite extremity of the arm 5 and forming one extremity of the recessed portion 9 is an angularly extending abutment or positioning means 17 for engaging one end of the test specimen 1. The angular contour of the abutment insures the inward movement of the mid-portion of the specimen towards the pivot shaft 15 during operation of the apparatus.

Associated with the fixed arm 5 is a similar, but moveable, arm 19. The moveable arm 19 includes a pivot shaft receiving opening 21, which overlies the similar pivot shaft receiving opening 13 on the fixed arm 5, a recessed face portion 23, and a specimen retaining abutment or positioning means 25 which is spaced from the axis of the pivot shaft receiving opening 21 a distance equal to the spacing of the abutment 17 from the axis of the opening 13 on the fixed arm. The pivot shaft 15 which rotatably extends through the hole 13 in the projection 11 of the fixed arm 5, extends through the hole 21 of the moveable arm 19 but is rigidly connected thereto by an indicator 26 (hereinafter described) which extends through both the shaft 15 and the arm 19, as shown in Figures 2 and 3. Unison of movement of the movement of the moveable arm 19 and the shaft 15, relative to the fixed arm 5, is thus obtained whereby the two normally divergent arms 5, 19 operate in a jaw-like manner. The inner end of the moveable arm 19 has a stop 28 for engagement with the projection 11 of the fixed arm 5 to limit the movement of the moveable arm 19, such that the included angle between the two arms cannot exceed 90 degrees. It will thus be appreciated that when the arms 5, 19 are in fully open position and the specimen 1 is placed therebetween, in engagement with the specimen engaging stops or arm abutments 17, 25, the two arms and specimen will take the form of a right, isosceles triangle.

A combination motor and reduction gearing are provided to rotate the moveable arm 19 from its fully open position, as shown in Figure 1, to its fully closed position at which it will matingly abut the fixed arm 5. During the course of this movement, the specimen 1, which has been placed between the arms 5, 19, will be bent inwardly towards the pivot shaft 15. The motor 30, which is preferably of the variable speed type, is equipped with a drive shaft 29 having a worm gear 31 keyed thereto. The worm gear 31 is in constant mesh with, and drives a worm wheel 33, keyed to a shaft 35 which is rotatably mounted in bearings 37 on an extension 39 of the projection 11 of the fixed arm 5. Also keyed to the rotatable shaft 35, as shown in Figure 2, is a speed reduction gear 36 which is in constant mesh with, and drives, a speed reduction spur gear 41. This spur gear 41 is rotatably mounted on the pivot shaft 15 to which is fixed the moveable arm 19. By means of a clutching device, hereinafter described, the driven spur gear 41 may be drivingly connected to the pivot shaft 15 to rotate the associated moveable arm 19 from its fully open position to its fully closed position in the manner described.

Referring to Figure 3 of the drawings, the assembly of the clutch in relation to the spur gear 41, pivot shaft 15 and moveable arm 19, is shown in the disengaged or at-rest position, wherein the spur gear 41 is inoperative to rotate the moveable arm 19. A reduced section 45 of the shaft 15 provides a shoulder 47 by means of which the shaft is supported on the inner race 48 of a ball bearing assembly 49. The outer race 50 of the bearing 49 is secured to the fixed arm by means of a press-fit with the side walls of the opening 13 and is limited in a downward direction by an inwardly directed circumferential flange 51 at the bottom of the opening 13. A still further reduced section 53 of the shaft 15 extends beneath the bearing 49; this reduced section 53 is threaded and has a nut 55 secured thereto for engagement with the inner race 48. The nut 55, when tightened against the inner race, maintains the shaft 15 in fixed relationship thereto and in rotational relationship with the outer race and the fixed arm 5.

The outside diameter of the shaft 15 is reduced from a point substantially midway between its extremities to the top of the shaft, providing a shoulder 61 on which is supported a downwardly extending hub 63 of the normally freely rotatable spur gear 41, as shown in Figure 3. A collar 67, which is fixed to the upper end of the shaft 15 by means of pins 69, forms an abutment for limiting the upward movement of the spur gear 41. Directly above the indicator 26, the shaft 15 is provided with an upwardly extending axial bore 57 which extends through the upper end thereof and which bore houses a vertically moveable clutch actuating member 59. Seated at the bottom of the axial bore 57, is a clutch actuating spring 71 which reacts against an elongated clutch engaging member 73. The clutch engaging member 73 extends transversely through a vertically elongated transverse bore 75 in the shaft 15 and is vertically slidable therein. The outer ends 77 of the clutch engaging member 73 are suitably dimensioned for matingly and drivingly engaging opposed notches 65 in the hub 63 of the spur gear 41, when urged upwardly by action of the spring 71. The clutch actuating member 59, which abuts the upper surface of the clutch engaging member 73, is selectively operative to hold the member 73 out of engagement with the hub 63 against the action of the spring 71. As shown in Figure 3 of the drawings, the actuator 59 has a handle-like portion 79 at its upper end having a depending finger-like stop 80 in engagement with the under-surface of the pins 69, thereby precluding upward movement of the clutch engaging member 73. As long as the handle is in the position shown, the spur gear 41 may be rotated independently of the shaft 15; conversely, the moveable arm 19 and the shaft 15 may be rotated relative to the spur gear 41. However, release of the stop 80 by rotating it out of engagement with the pin 69, will cause the clutch actuator 59, and the clutch engaging member 73 to be moved upwardly by the action of the spring 71 into engagement with a pair of notches 65 in the spur gear hub 63, as shown in Figure 2A. The moveable arm 19 and the spur gear 41 will then be locked together for joint rotational movement such that energization of the motor 30 will effectively rotate the moveable arm 19 into closing engagement with the fixed arm 5.

A scale 81, over which the indicator 26 moves during its rotation with the moveable arm 19, is positioned on the base 3 of the apparatus such that the indicator 26 will overlie one extremity thereof in its initial or starting position (when the moveable arm is perpendicular to the fixed arm) and will overlie the other extremity thereof at the end of its movement (when the moveable arm is in full face contact with the fixed arm). For purposes of illustration, the scale is shown graduated in degrees from 0 to 180 to indicate the angle through which the specimen is bent by the rotational movement of the moveable arm 19; at the same time it comparatively denotes the angular and spatial separation of the two arms 5, 19. Inasmuch as only comparative rating of the materials tested is desired, it will be recognized that the scale may be graduated to include any value, whether it be in terms of distance, angle of rotation, numerical index, etc. Adjacent to the end of the scale 81 is a microswitch 83, which upon being contacted by the indicator 26 at the end of its movement, will de-energize the motor 30. Thus, the switch 83 effectively prevents damage to the apparatus which would be caused by continued operation of the gear train after the moveable arm 19 has come to rest in full-face contact with the fixed arm 5.

*Operating conditions*

In order to obtain accurate measurements of a group of unlike materials, it is important that the operating conditions be maintained uniform for each material tested. As stated hereinbefore, some materials will fracture only at a low temperature. An ambient temperature should, therefore, be maintained which will be low enough to assure fracture of all the specimens of an equal size in any one test group. By conducting the tests in a cold-room, or in other suitably conditioned surroundings wherein it is possible to maintain a substantially constant temperature, accurate test results may be obtained. In testing vinyl specimens, for example, which had a formulation of 70% VYNS (vinyl chloride-vinyl acetate copolymer) and 30% tricresyl phosphate plasticizer, a very satisfactory comparison with other similar vinyl materials was obtained at an ambient temperature of −37 degrees F.

Since it is desired to primarily measure the relative flexibility of the materials, it is highly desirable to avoid subjecting the specimens to any impact loads as might result from bending the specimen at an irregular or excessive rate. The speed of rotation of the moveable arm 19, is, therefore, controlled by the speed of the variable speed motor 30, or by suitable variable speed reduction gearing, so as to move the moveable arm 19 into closing engagement with the fixed arm 5 at a predetermined, constant speed. In testing the vinyl specimens it was found that a full closing time of 15 seconds gave uniformly accurate results.

Moving at this relatively slow rate of speed it was found that the moveable arm 19 imparted substantially no impact loading to the specimen and the position of the indicator 26 on the scale 81 was accurately determined at the fracture point of the specimen.

It will be recognized that the ambient temperature and the rate of bend may be varied for each specimen tested. Thus, highly accurate test results may be obtained by testing several specimens of a single material at different temperatures and/or at different bending speeds and similarly varying the conditions for the same number of specimens of each material tested. The changing conditions will affect the plastic flow of each specimen, controlling the fracture point thereof, such that the difference in flexibility of each material will be more pronounced, increasing the value of the tests. The specimen is bent at a constant rate for each of the tests, but this rate may be changed for any test by adjusting the speed of the variable speed drive motor 30. Inasmuch as the moveable arm 19 traverses an arc of 90 degrees in moving from the fully open position to its closed position, it will be noted that the specimen would (if it did not fracture) be bent through a total angle of 180 degrees from initial to final position, at which position one end would be bent back upon the other end. The constant speed of travel of the moveable arm 19 thus assures a constant bend rate for the specimen to the fracture point thereof.

Although the specimens are bent through the given angle at a constant rate, the radii of curvature of the bent portions decrease. Referring to Figure 1, the specimen, moveable arm and indicator are shown in their initial or starting position in full lines, in a second position in broken lines with the elements designated by single primed (') reference numerals, and in a third position in dot-dash lines with the elements designated by double primed (") reference numerals. In the referred to second position in which the specimen has been bent through 60 degrees, as represented by the indicator 26', it will be noted that the mid-section of the specimen 1' is bent inwardly towards the pivot shaft 15 and the arms 5, 19' engage the outer extremities of the specimen along a tangent of the arc defined by the bent portion. Upon being continuously rotated to the referred-to third position, in which the specimen has been bent through an angle of 120 degrees as represented by the indicator 26", the moveable arm 19" and the fixed arm 5 engage the specimen closer to its mid-section, decreasing the effective length of the specimen, and additionally decreasing the radius of curvature thereof. Due to the continuous shift of the point of contact of the specimens with the arms 5, 19, to a point closer to the pivot 15, there is a continuous decrease of the radius of the bent portion of the specimen. By decreasing the radius of curvature in this manner, the bending forces are continuously focused at a central portion of the specimen, the concentration of the forces increasing as the specimen is bent. Thus, a true relationship of the angle through which the specimen is bent with respect to the radius of curvature at the bent portion always exists. It will be readily visualized that, if the intermediate portions of each leg of a specimen were left free of engagement with the arms by bending the specimen away from the pivot 15, the specimen might readily be bent through 180 degrees without fracture and could conceivably assume the shape of a semicircle; each specimen could then assume a different shape precluding a true comparison. By confining the specimen to a fixed path of bending as described, however, accurate measurements are obtained.

*Operation*

A sample specimen is placed between the open arms 5, 19, as shown in Figure 1, with the ends thereof in engagement with the abutments 17, 25, respectively, the latter being disposed at equal distances from the vertex of the arms.

The stop 80 associated with the handle 79 of the clutch actuator 59 is released from engagement with its associated pin 69 (as shown by the broken line position 79' of the handle) whereby the outer ends 77 of the clutch engaging member 73, by the action of the spring 71, are urged into meshing engagement with a pair of diametrically opposed notches 65 in the hub 63 of the spur gear 41, the parts assuming the positions shown in Figure 2A.

Upon energizing the motor 30, power is delivered through the gear train to the spur gear 41, through the clutch and thence to the moveable arm 19, whereby the moveable arm 19 will move into closing engagement with the fixed arm 5. During the course of this movement, the ends of the specimen traverse a common arcuate path while the specimen is bent inwardly, as shown in broken lines in Figure 1 by the angular sides of the abutments 17, 25. Concurrently with the movement of the arm 19, the indicator moves over its associated scale 81, whereby the angle through which the specimen has been bent may be simultaneously determined. Thus, when the arm 19 is rotated an amount sufficient to fracture the specimen, the scale 81 may be visually observed to obtain the fracture point for that particular specimen. After the specimen has fractured, continued rotation of the arm 19 may be halted by exerting a downward pressure on the handle 79 of the clutch actuator 59 and engaging the stop 80 beneath one of the pins 69, as shown in Figure 2. The continued operation of the motor and gear train is thereby inoperative to further rotate the arm 19. If desired, the power switch 84 may then be moved to the OFF position to de-energize the motor 30. In the event that sufficient time is not available to manually disengage the clutch 43 in this manner, before the arm 19 has fully closed into engagement with the fixed arm 5, the motor will automatically be deenergized by the action of the indicator 26 coming into contact with the micro-switch 83 at the end of the scale, thereby preventing damage to the parts. In many instances, it will be found more convenient to rely solely on the automatic de-energization of the motor to prevent this damage rather than having to resort to the manual de-clutching operation.

If the movement of the arm is stopped by manually disengaging the clutch, the apparatus may be reset to test the next specimen by rotating the arm back to its fully open position, notwithstanding the fact that the motor and gear train may be in continuous operation. Thus, after the new specimen is placed between the arms 5, 19, rotation of the moveable arm 19 may be initiated by rotating the handle 79 to release the stop 80 from engagement with the pin 69 such that the rotating spur gear 41 will instantaneously drive the arm 19.

If, however, rotation of the arm 19 was automatically stopped by engagement of the indicator 26 with the micro-switch 83, the apparatus may be reset to test the next specimen by moving the power switch 84 to the OFF position, de-clutching the arm, rotating the arm 19 back to its fully open position and then clutching the arm back into driving engagement with the spur gear 41. The new specimen is then placed between the arms 5, 19 and the motor upon being energized, by moving the power switch 84 to the ON position, will be effective to again rotate the arm 19 towards its closed position, bending the new specimen in the manner described.

It will be obvious to those skilled in the art that many other and different arrangements may be used within the purview of this invention. It is to be understood that the form of the invention herewith shown and described is to be taken as the preferred example of the same and that changes in the shape, size and arrangement of the parts may be resorted to without departing from the spirit of the invention. For example, both arms may be made rotatable relative to each other and electrical and magnetic measurement components may be substituted for the visually observed indicator and scale. It is, therefore, desired that the particular form disclosed be taken as illustrative and not as limiting. We furthermore, do not wish to be limited beyond the limitations which may be imposed by the following claims.

We claim:

1. Apparatus for testing the flexibility of materials comprising: a pair of specimen receiving stops mounted for arcuate movement relative to each other, said stops being normally disposed angularly displaced from each other with respect to a reference point and equidistant from said reference point, mechanism for varying the angular displacement between said stops without altering the distance between said stops and said reference point, and an indicator so connected and arranged with at least one of said stops to denote the variation in said angular displacement.

2. Apparatus for determining the flexibility of solids, comprising: a pair of divergent arms, at least one of said arms being pivotably mounted for angular movement with respect to the other of said arms in a common plane, positioning means on said pair of arms for engaging a material specimen at opposite ends thereof, said positioning means being disposed at points equidistant from the vertex of said arms, mechanism connected with said pair of arms for varying the displacement between said positioning means, and means so connected and arranged with at least one of said arms for indicating the extent of said displacement.

3. Apparatus for testing the flexibility of materials comprising a pair of arms, a common pivotal connection for said arms, each of said arms having a stop for engaging the ends of a specimen of material to dispose said specimen therebetween, said stops being disposed at equal distances from said pivotal connection, mechanism connected with said arms for reducing the angular displacement between said arms whereby the distance between said stops is decreased, and an indicator so connected and arranged with said arms to denote said angular displacement.

4. Apparatus for testing the flexibility of materials comprising a pair of arms; a common pivotal connection for said arms, each of said arms having specimen receiving abutments equally spaced from said common pivotal connection for engaging respective ends of said specimen; a motor; a clutch operatively connecting said motor with at least one of said arms; and a movement indicator so connected and arranged with at least one of said arms; and indicator being responsive to movement caused by energizing said motor and engaging said clutch with at least one arm associated therewith.

References Cited in the file of this patent

UNITED STATES PATENTS

| | | |
|---|---|---|
| 1,595,318 | Shields | Aug. 10, 1926 |
| 1,874,780 | McGuckin | Aug. 30, 1932 |
| 2,131,805 | Howe | Oct. 4, 1938 |
| 2,426,583 | Bailey | Sept. 2, 1947 |
| 2,462,826 | De Waard et al. | Feb. 22, 1949 |

FOREIGN PATENTS

| | | |
|---|---|---|
| 594,732 | Germany | Mar. 21, 1934 |
| 892,354 | France | Jan. 7, 1944 |